(12) United States Patent
Gaines

(10) Patent No.: US 11,338,418 B2
(45) Date of Patent: May 24, 2022

(54) JOINT PRESS ADAPTER

(71) Applicant: Snap-on Incorporated, Kenosha, WI (US)

(72) Inventor: Preston T. Gaines, Racine, WI (US)

(73) Assignee: Snap-on Incorporated, Kenosha, WI (US)

( * ) Notice: Subject to any disclaimer, the term of this patent is extended or adjusted under 35 U.S.C. 154(b) by 0 days.

(21) Appl. No.: 16/995,452

(22) Filed: Aug. 17, 2020

(65) Prior Publication Data
US 2022/0048170 A1 Feb. 17, 2022

(51) Int. Cl.
*B25B 27/02* (2006.01)
*F16L 27/04* (2006.01)

(52) U.S. Cl.
CPC ............... *B25B 27/02* (2013.01); *F16L 27/04* (2013.01)

(58) Field of Classification Search
None
See application file for complete search history.

(56) References Cited

U.S. PATENT DOCUMENTS

| | | | | |
|---|---|---|---|---|
| 2,146,641 A | * | 2/1939 | McWane | F16L 21/03 277/625 |
| 7,610,664 B2 | | 11/2009 | Wridt et al. | |
| 7,669,305 B1 | | 3/2010 | Lionberg | |
| 7,762,015 B2 | | 7/2010 | Smith et al. | |
| 7,890,305 B2 | | 2/2011 | Lionberg | |
| 7,895,723 B2 | | 3/2011 | Wridt | |
| 8,156,625 B2 | | 4/2012 | Lionberg | |
| D815,160 S | | 4/2018 | Neubauer | |
| 11,161,228 B2 | * | 11/2021 | Schley | B25B 27/0035 |
| 2006/0242810 A1 | | 11/2006 | Wridt | |
| 2010/0114349 A1 | | 5/2010 | Lionberg | |
| 2019/0375081 A1 | | 12/2019 | Schley | |
| 2020/0346330 A1 | | 11/2020 | Kochie | |

FOREIGN PATENT DOCUMENTS

| | | | | |
|---|---|---|---|---|
| DE | 29914160 U1 | * | 12/1999 | ............... F16L 47/12 |
| GB | 2406888 A | * | 4/2005 | ............... F16L 41/02 |

OTHER PUBLICATIONS

Machine Translation of DE29914160 (Year: 1999).*
English Translation of DE 29914160 (Year: 1999).*
Master Ball Joint Press Product Listing, Orion Motor Tech Store as found on Amazon.com (Year: 2017).*
Ajay, "Fillets and Chamfers—How to Choose it?" (May 21, 2019). https://www.veryengineering.com/fillets-and-chamfers-how-to-choose-it/ (Year: 2019).*
Combined Search and Examination Report for corresponding Application No. GB2111260.2 dated Dec. 23, 2021, 6 pages.

* cited by examiner

*Primary Examiner* — Tyrone V Hall, Jr.
(74) *Attorney, Agent, or Firm* — Seyfarth Shaw LLP

(57) ABSTRACT

A slip-on adapter that is adapted to be coupled to existing adapters that have already been developed. The slip-on adapter couples to existing adapters by positive retention on either the outside diameter or inside diameter of the existing adapter. For example, the slip-on adapter can include an O-ring that grips the outside diameter of the existing adapter that it is slipped onto. The slip-on adapter can also be used as a "flip adapter" with different geometries at both ends for use with two different size ball joints. This allows for less expensive adapters for new size ball joints by connecting to existing adapters, rather than requiring full machining of a new adapter.

18 Claims, 3 Drawing Sheets

JOINT PRESS ADAPTER

TECHNICAL FIELD

The present application relates generally to joint press adapters, and more particularly to adapters for a ball joint press.

BACKGROUND

Joint press kits are used to install and remove joints, such as press-in ball joints and universal joints of vehicle suspensions. A joint press kit often includes several adapters for differently sized ball joints, and most function on the same basic principle to press a ball joint. In general, a frame or yoke is used to contain the assembly, force is applied to the ball joint through an adapter on one side (usually via a pressure screw or hydraulic unit), while bracing on the opposite side with a receiver cup that the ball joint fits into. The ball joint is pressed into or through a control arm or steering knuckle. For example, the adapters typically fall into two categories: 1) "push" adapters bear against joints to drive them in a particular direction, e.g. into or out of a vehicle suspension; and 2) "receiver" adapters bear against the vehicle suspension and receive a joint as it is pushed. Thus, the push adapter and the receive adapter cooperate to force the joint either into or out of a vehicle suspension or steering knuckle.

Adapters are typically made to service a particular type of joint. The size and the shape of the adapter are tailored to the characteristics of the joint that it is to service. However, there are many different sizes and shapes of ball joints. For example, typical joint presses require an adapter that rides on the ball joint's predetermined press surface. The adapter is sized to fit on and over the ball joint and apply force to appropriate surfaces of the ball joint and the joint press. Conventional joint presses therefore require different adapters for the many sizes of ball joints. Further, as new ball joints are created, new adapters are required for proper sizing. Currently, technicians use personally fabricated pieces, brute force (such as hammering on the ball joint), or a inappropriately sized adapters to service ball joints.

SUMMARY

The present invention relates broadly to a slip-on adapter that is adapted to be coupled to existing adapters that have already been developed, such as those disclosed in U.S. Pat. No. 7,610,664. The slip-on adapter couples to existing adapters by positive retention on either the outside diameter or inside diameter of the existing adapter. For example, the slip-on adapter can include an O-ring that engages the outside diameter of the existing adapter that it is slipped onto. The slip-on adapter can also be used as a "flip adapter" with different geometries at both ends for use with installing and removing a ball joint, and/or for use with two different size ball joints. This allows for less expensive adapters for new size ball joints by connecting to existing adapters, rather than requiring a new adapter.

In an embodiment, the present invention broadly comprises an adapter for a ball joint press. The adapter includes a body having first and second end portions, wherein the first end portion is adapted to releasably couple to a first connector (first existing adapter) of the ball joint press, and the second end portion is adapted to releasably couple to a second connector (second existing adapter) of the ball joint press.

In an embodiment, the present invention broadly comprises an adapter for a ball joint press including first and second connectors (first and second existing adapters). The adapter includes a body having first and second end portions. An inwardly extending ledge protrudes inwardly from an inner surface of the body, and is disposed between the first and second end portions. A first groove is disposed in the inner surface of the body proximal to a first side of the ledge. A first O-ring is disposed in the first groove, wherein the first O-ring is adapted to frictionally releasably couple the first end portion to an outer diameter of the first connector. A second groove is disposed in the inner surface of the body proximal to a second side of the ledge. A second O-ring is also disposed in the second groove, wherein the second O-ring is adapted to frictionally releasably couple the second end portion to the outer diameter of the second connector.

BRIEF DESCRIPTION OF THE DRAWINGS

For the purpose of facilitating an understanding of the subject matter sought to be protected, there are illustrated in the accompanying drawings embodiments thereof, from an inspection of which, when considered in connection with the following description, the subject matter sought to be protected, its construction and operation, and many of its advantages should be readily understood and appreciated.

DETAILED DESCRIPTION

Figure 1:
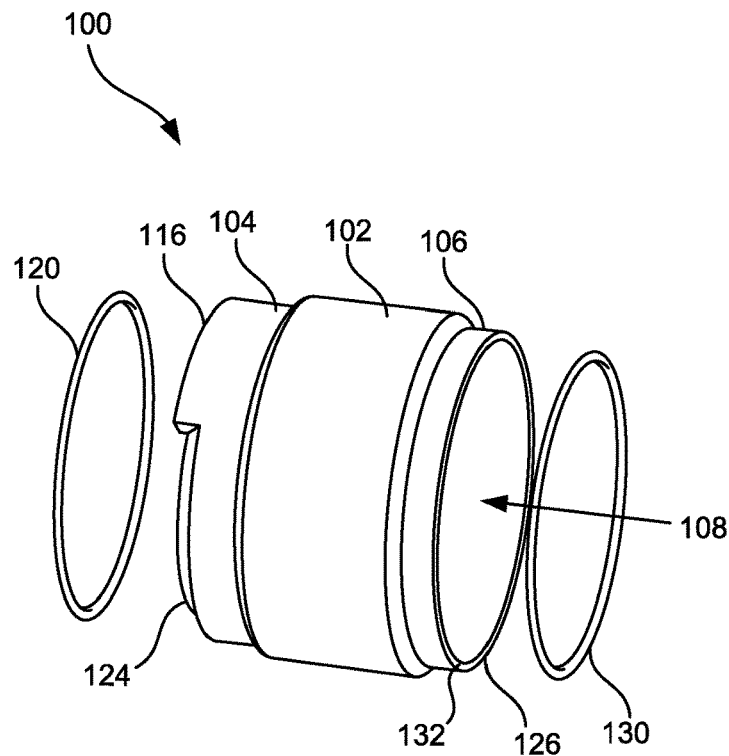
FIG. 1 is an exploded perspective view of an adapter, according to an embodiment of the present invention.

While this invention is susceptible of embodiments in many different forms, there is shown in the drawings, and will herein be described in detail, a preferred embodiment of the invention with the understanding that the present disclosure is to be considered as an exemplification of the principles of the invention and is not intended to limit the broad aspect of the invention to embodiments illustrated. As used herein, the term "present invention" is not intended to limit the scope of the claimed invention and is instead a term used to discuss exemplary embodiments of the invention for explanatory purposes only.

The present invention broadly comprises a slip-on adapter that is adapted to be releasably coupled to existing adapters that have already been developed. The slip-on adapter releasably couples to existing adapters by positive retention on either the outside diameter or inside diameter of the existing adapter. For example, the slip-on adapter can include an O-ring that grips the outside diameter of the existing adapter that it is slipped onto. The slip-on adapter can also be used as a "flip adapter" with different geometries at both ends for use with two different size ball joints. This allows for less expensive adapters for new size ball joints by connecting to existing adapters, rather than requiring full machining of a new adapter.

Figure 2:
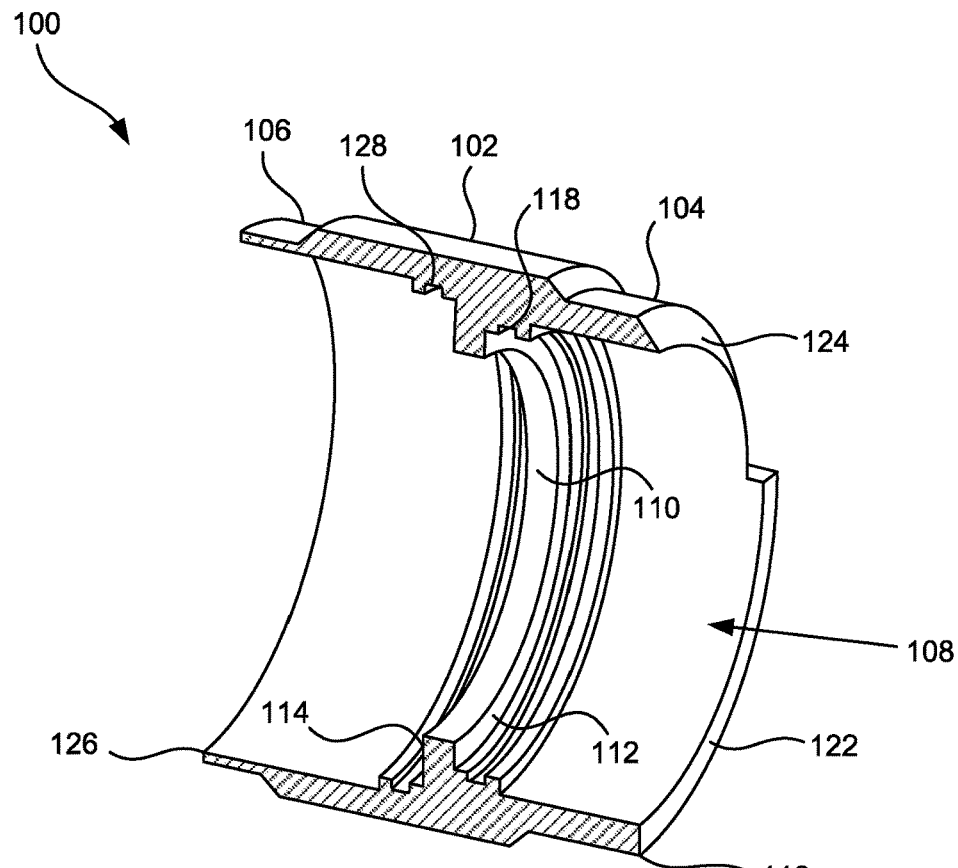
FIG. 2 is a sectional perspective view of the adapter of FIG. 1 taken along a longitudinal axis of the adapter.
Figure 3:
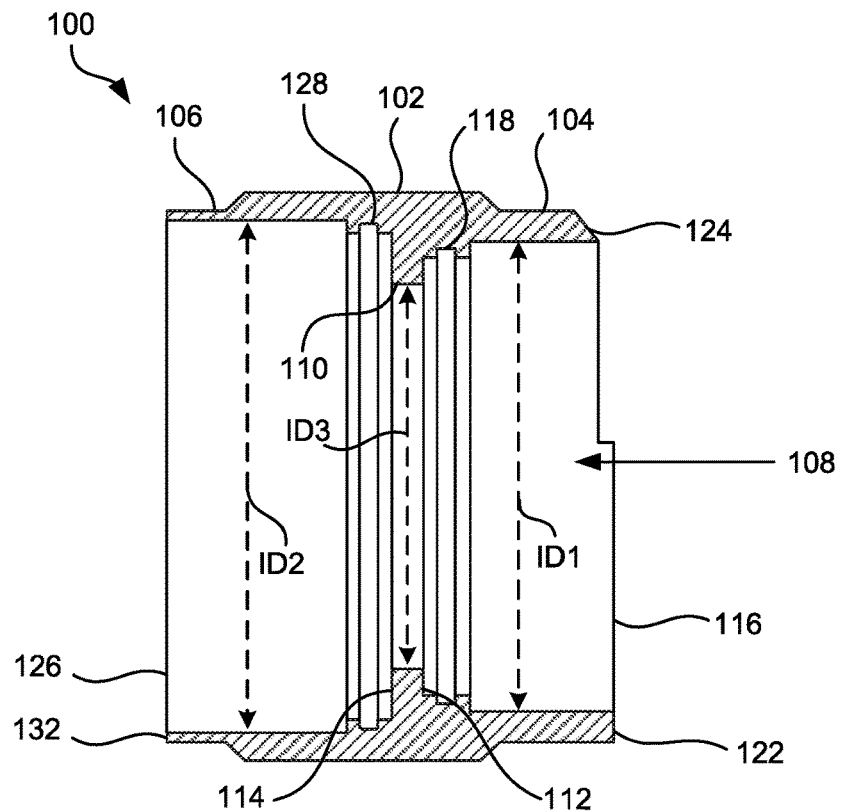
FIG. 3 is a sectional side view of the adapter of FIG. 1 taken along a longitudinal axis of the adapter.

Referring to FIGS. 1-3, a slip-on adapter 100 includes a body 102 having opposing first and second end portions 104, 106, and a hole or bore 108 extending through the body 102. A contact surface or inwardly protruding ledge 110 is disposed on or extends from an internal surface of the body 102 between the first and second end portions 104, 106. The ledge 110 has first and second sides 112, 114, where the first side 112 faces in a direction towards the first end portion 104 and the second side 114 faces in an opposite direction towards the second end portion 106.

The first end portion 104 extends from a first end 116 of the body 102 towards the ledge 110. A first groove 118 is disposed on the inner surface of the body 102 proximal to the first side 112 of the ledge 110, and is adapted to receive and retain a first O-ring 120 therein. The first end portion 104 also has a first inner diameter ID1 that extends from the first end 116 into the first end portion 104 towards the first groove 118.

The first end 116 of the first end portion 104 may also include an end surface 122 and a cut-out portion 124. The end surface 122 may be flat, and the cut-out portion 124 may have a chamfered surface. A first length extending from the end surface 122 to the ledge 110 may be larger than a second length extending from the surface of the cut-out portion 124 to the ledge 110.

The size and shape of the end surface 122 and cut-out portion 124 of the first end portion 104 may be adapted to engage a ball joint to install and/or remove the ball joint from a control arm, vehicle suspension, and/or steering knuckle. For example, the cut-out portion 124 may allow for clearance of a frame of the control arm, vehicle suspension, and/or steering knuckle, and the end surface 122 may be adapted to abut the frame of the control arm, vehicle suspension, and/or steering knuckle; or a ball joint to assist in installation or removal of the ball joint.

The second end portion 106 extends from a second end 122 of the body 102 towards the ledge 110. A second groove 128 is disposed on the inner surface of the body 102 proximal to the second side 114 of the ledge 110, and is adapted to receive and retain a second O-ring 130 therein. The second end portion 106 also has a second inner diameter ID2 that extends from the second end 126 into the second end portion 106 towards the second groove 128. In an embodiment, the first inner diameter ID1 may be smaller than the second inner diameter ID2. The ledge 110 may also include a third inner diameter ID3 that is smaller than the first inner diameter ID1, and smaller than the second inner diameter ID2.

The second end 126 of the second end portion 106 may also include an end surface 132 that may be flat or chamfered. A third length extending from the end surface 132 (or second end 126) to the ledge 110 may be larger than the first length extending from the end surface 122 to the ledge 110.

The size and shape of the end surface 126 of the second end portion 106 may also be adapted to engage a ball joint to install and/or remove the ball joint from a control arm, vehicle suspension, and/or steering knuckle. For example, the end surface 126 may be adapted to abut the frame of the control arm, vehicle suspension, and/or steering knuckle; or a ball joint to assist in installation or removal of the ball joint. In this respect, the first and second end portions 104 and 106 may be adapted for installation and/or removal of different style ball joints.

Figure 4:
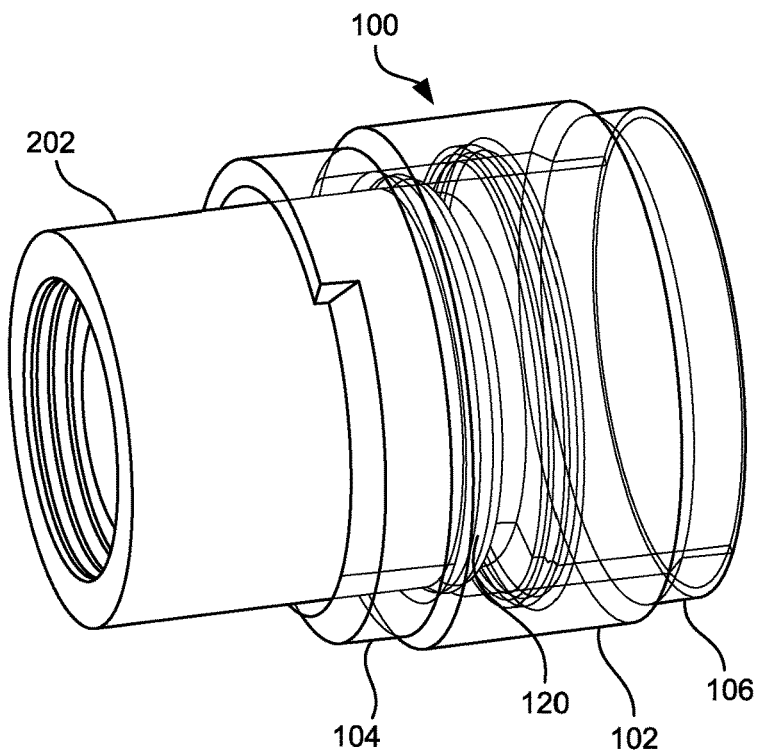
FIG. 4 is phantom view of the adapter of FIG. 1 coupled to a ball joint press adapter, according to an embodiment of the present invention.
Figure 5:
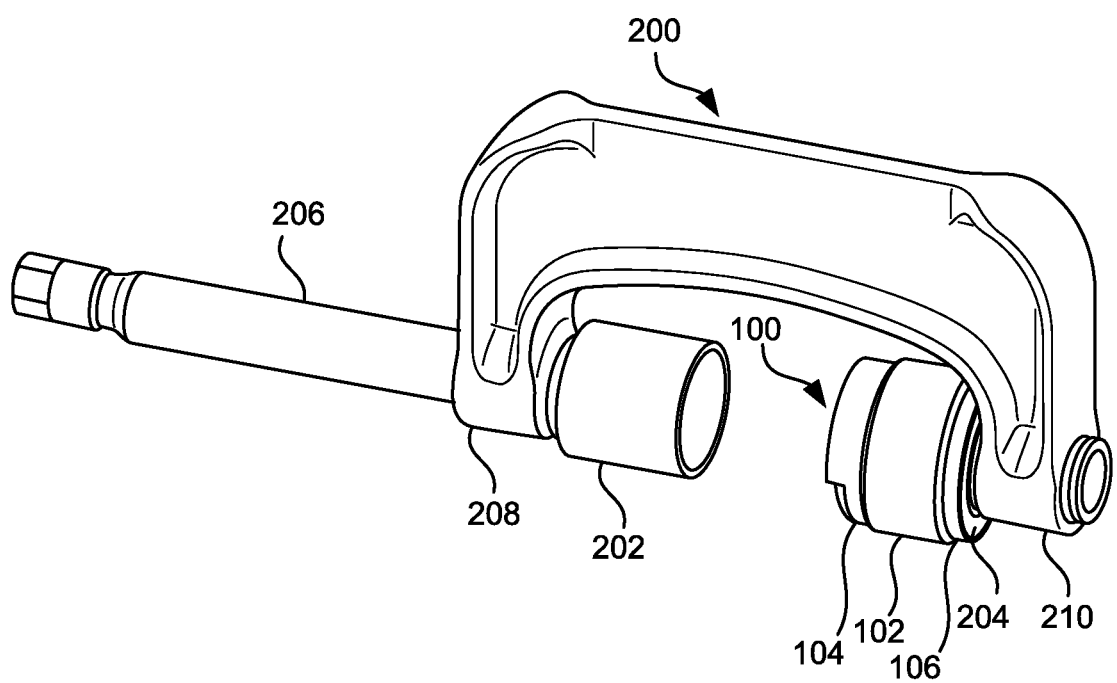
FIG. 5 is a perspective view of the adapter of FIG. 1 coupled to a ball joint press, according to an embodiment of the present invention.

Referring to FIGS. 4 and 5, the first and second end portions 104, 106 are adapted to be removably coupled to first and second existing adapters 202, 204 (referred to herein as first and second connectors 202, 204) of an existing ball joint press kit with a frame 200 and a compression or pressure screw 206. For example, the first end portion 104 may be adapted to couple to either or both of the first and second connectors 202, 204; and the second end portion 106 may be adapted to couple to either or both of the first and second connectors 202, 204. This allows the adapter 100 to be compatible with existing ball joint press kits, as well as potentially future ball joint press kits, without requiring a user to purchase a new kit.

For example, a ball joint press kit may include the frame 200, which may be a "C" type shaped frame or yoke, with opposing first and second ends 208, 210. The first end 208 may be adapted to receive the pressure screw 206, and a connector, such as the first connector 202 adapted to couple to the pressure screw. The first connector 202 may also be adapted to engage and allow for removal or installation of a specific type of ball joint. The second end 210 is adapted to releasably couple to the second connector 204, which may cooperate with the first connector 202 to engage and allow for removal or installation of a specific type of ball joint. However, the first and second connectors 202, 204 may not be suitable for removal or installation of a different type of ball joint. Thus, the adapter 100 may be coupled to one of the first and second connectors 202, 204 to allow for removal or installation of the different type of ball joint.

Referring to FIG. 4, in an example, the first end portion 104 may be releasably coupled to the first connector 202. The first inner diameter ID1 of the first end portion 104 may be slightly larger than an outer diameter of the first connector 202. This allows the first end portion 104 to be slid over or onto an end of the first connector 202, and the first side 112 of the ledge 110 may abut the end of the first connector 202. The first O-ring 120 disposed in the first groove 118 grips and provides a friction fit or interference fit on the outer diameter of the first connector 202 to couple the adapter 100 to the first connector 202.

Similarly, referring to FIG. 5, in an example, the second end portion 106 may be releasably coupled to the second connector 204. The second inner diameter ID2 of the second end portion 106 may be slightly larger than an outer diameter of the second connector 204. This allows the second end portion 106 to be slid over or onto an end of the second connector 204, and the second side 114 of the ledge 110 may abut the end of the second connector 204. The second O-ring 130 disposed in the second groove 128 grips and provides a friction fit or interference fit on the outer diameter of the second connector 204 to couple the adapter 100 to the second connector 204.

In an another embodiment, the ledge 110 may be an outwardly extending ledge that extends outwardly from an outer diameter of the body 102 of the adapter 100. Similarly, the first and second grooves 118, 128 and first and second O-rings 120, 130 may be disposed on the outer diameter of the body 102 of the adapter 100. In this embodiment, a first outer diameter of the first end portion may be slightly smaller than an inner diameter of the first connector 202 to allow the first end portion to be slid into an end of the first connector 202. The end of the first connector 202 then abuts the first side of the ledge, and the first O-ring disposed in the first groove grips and provides a friction fit or interference fit on the inner diameter of the first connector 202. Similarly, in this embodiment, a second outer diameter of the second end portion may be slightly smaller than an inner diameter of the second connector 204 to allow the second end portion to be slid into an end of the second connector 204. The end of the second connector 204 then abuts the second side of the ledge, and the second O-ring disposed in the second groove grips and provides a friction fit or interference fit on the inner diameter of the second connector 204.

As used herein, the term "coupled" and its functional equivalents are not intended to necessarily be limited to direct, mechanical coupling of two or more components. Instead, the term "coupled" and its functional equivalents are intended to mean any direct or indirect mechanical, electrical, or chemical connection between two or more objects, features, work pieces, and/or environmental matter. "Coupled" is also intended to mean, in some examples, one object being integral with another object.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of the inventors' contribution. The actual scope of the protection sought is intended to be defined in the following claims when viewed in their proper perspective based on the prior art.

What is claimed is:

1. An adapter for a ball joint press, the adapter comprising:
    a body having first and second end portions, wherein the first end portion is adapted to releasably couple to a first connector of the ball joint press, and the second end portion is adapted to releasably couple to a second connector of the ball joint, and wherein the first end portion includes a first end with a cut-out portion that at least partially extends circumferentially around the first end;
    a ledge protruding inwardly from an inner surface of the body and disposed between the first and second end portions; and
    a first groove disposed in the inner surface of the body proximal to a first side of the ledge.

2. The adapter of claim 1, further comprising a first O-ring disposed in the first groove.

3. The adapter of claim 2, wherein the first end portion has a first inner diameter adapted to receive an outer diameter of the first connector.

4. The adapter of claim 3, wherein the first O-ring is adapted to frictionally couple the first end portion to the outer diameter of the first connector.

5. The adapter of claim 1, further comprising a second groove disposed in the inner surface of the body proximal to a second side of the ledge.

6. The adapter of claim 5, further comprising a second O-ring disposed in the second groove.

7. The adapter of claim 6, wherein the second end portion has a second inner diameter adapted to receive an outer diameter of the second connector.

8. The adapter of claim 7, wherein the second O-ring is adapted to frictionally couple the second end portion to the outer diameter of the second connector.

9. The adapter of claim 1, wherein the first end includes a first end surface, and a first length extending from the first end surface to the ledge is larger than a second length extending from a surface of the cut-out portion to the ledge.

10. The adapter of claim 9, wherein the first end surface is flat.

11. The adapter of claim 1, wherein the cut-out includes a chamfered surface.

12. The adapter of claim 1, wherein the second end portion includes a second end with a second end surface.

13. An adapter for a ball joint press kit including first and second connectors, comprising:
    a body having first and second end portions, wherein the first end portion includes a first end with a cut-out portion that at least partially extends circumferentially around the first end;
    a ledge protruding inwardly from an inner surface of the body, and disposed between the first and second end portions;
    a first groove disposed in the inner surface of the body proximal to a first side of the ledge;
    a first O-ring disposed in the first groove, wherein the first O-ring is adapted to frictionally couple the first end portion to an outer diameter of the first connector;
    a second groove disposed in the inner surface of the body proximal to a second side of the ledge; and
    a second O-ring disposed in the second groove, wherein the second O-ring is adapted to frictionally couple the second end portion to the outer diameter of the second connector.

14. The adapter of claim 13, wherein the first end includes a first end surface, and a first length extending from the first end surface to the ledge is larger than a second length extending from a surface of the cut-out portion to the ledge.

15. The adapter of claim 14, wherein the first end surface is flat.

16. The adapter of claim 13, wherein the cut-out includes a chamfered surface.

17. The adapter of claim 13, wherein the second end portion includes a second end with a second end surface.

18. The adapter of claim 17, wherein the second end surface is flat.

* * * * *